Sept. 16, 1969  H. G. FRYE  3,466,736
EDGE-CLADDING OF A CLAD METAL PLATE
Filed Aug. 26, 1966
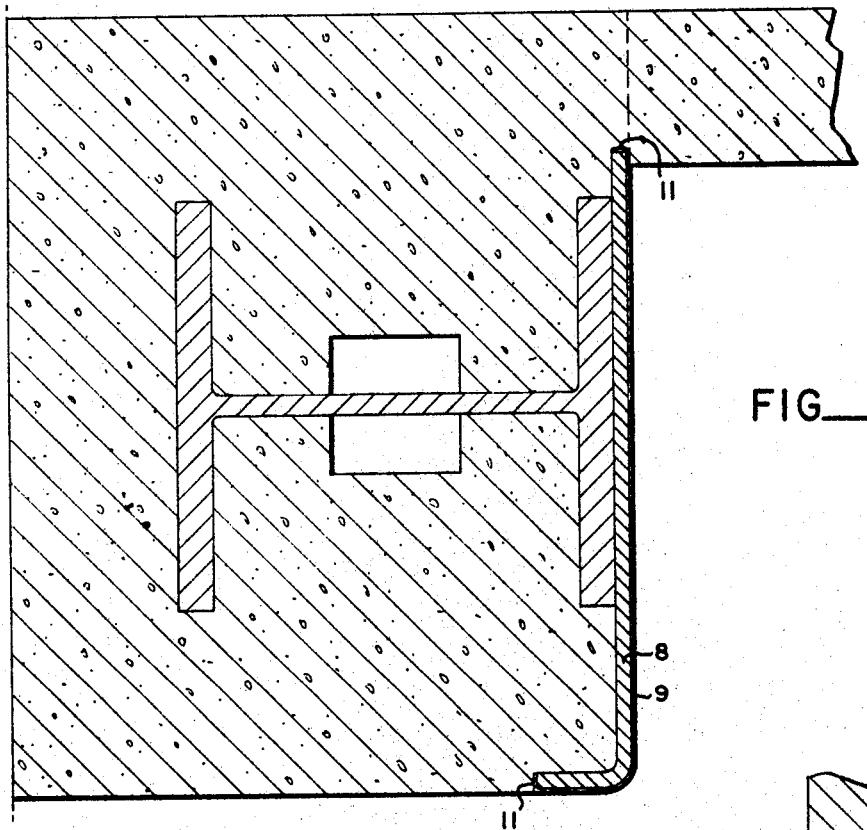
FIG__1
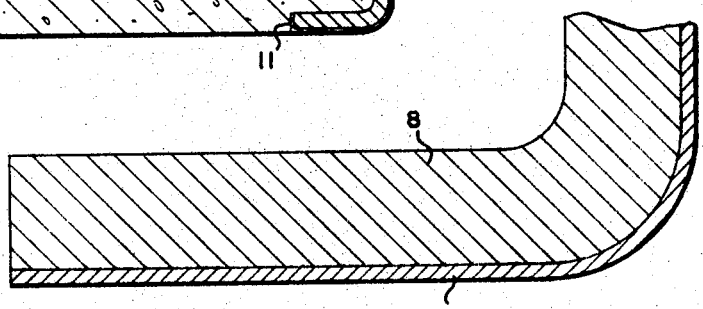
FIG__2
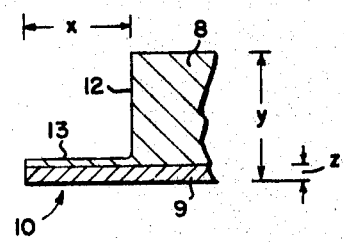
FIG__3
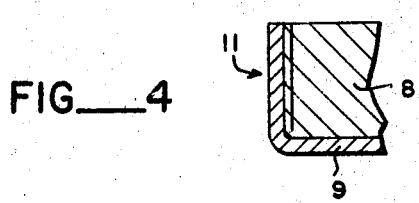
FIG__4
HENRY G. FRYE
INVENTOR.
BY Seed & Berry
ATTORNEYS

United States Patent Office 3,466,736
Patented Sept. 16, 1969

3,466,736
EDGE-CLADDING OF A CLAD METAL PLATE
Henry G. Frye, Seattle, Wash., assignor to Pacific Car and Foundry Company, Renton, Wash., a corporation of Washington
Filed Aug. 26, 1966, Ser. No. 575,319
Int. Cl. B23k *31/02*
U.S. Cl. 29—477.7  7 Claims

ABSTRACT OF THE DISCLOSURE

This invention relates to the edge-cladding of a metal plate to which cladding has been applied to one or both of the sides, and has for its object to provide a method which is comparatively simple and inexpensive to perform and which will provide for an edge or edges of the plate an overlay of the same composition as the side cladding.

DESCRIPTION OF THE DRAWINGS

In the accompanying drawing:
FIGURE 1 is a fragmentary horizontal sectional view of a dam in which there is employed a clad metal plate to serve as a corrosion-resisting guide for a lock gate, the plate having been processed in accordance with teachings of the present invention.
FIG. 2 is a fragmentary horizontal sectional view, enlarged from the scale of FIG. 1, illustrating the plate as it appears after having been cut to size preparatory to being processed; and
FIGS. 3 and 4 are fragmentary horizontal sectional views showing successive processing steps.

DESCRIPTION OF INVENTION

Referring to said drawing, the clad plate here illustrated is shown as having been shaped to perform the function of a facing for one side of the guideway for the lock of a dam. The numeral 8 denotes the plate proper, and 9 the cladding.

For the dam usage in which I have here elected to show a clad plate, the purpose of the cladding is to provide a corrosion resistant overlay, and for this example of an application of the invention is can be assumed that the composition of the plate proper is carbon steel and that of its cladding stainless steel. In the original application of cladding to a sheet of industrial-thickness metal, it will be understood that the applied cladding covers one or both sides of the sheet. Plates of the size required for any given construction project are cut and shaped from this sheet stock. The edges are perforce bare.

The process of the present invention requires that for each edge which is to be clad the clad plate be cut oversize to an $x$ distance arrived at by subtracting from the thickness of the clad sheet a figure moderately greater than the thickness of the cladding. This can be expressed as $$x \pm = y - (z + \tfrac{1}{32}'')$$

where $y$ is the thickness of the clad sheet, $z$ is the thickness of the cladding, and $\tfrac{1}{32}''$ the moderate addition. The oversize plate is shown in FIG. 2.

The next step in the process is to mill from the non-clad side of the plate a re-entrant right-angled recess as indicated in FIG. 3. For purposes of distinction the face 12 of this recess will be termed the flank face and the face 13 the curtain face. The curtain face parallels the clad side of the plate and is spaced therefrom a distance amounting to the thickness, say $\tfrac{1}{16}''$, of the cladding plus said addition ($\tfrac{1}{32}''$), and there is thus produced a fly prolongation 10 comprised of a thin layer of the plate material backed by cladding. For this machining operation it is desirable to clamp the plate to a carriage mounted for reciprocatory movement and perform the milling, in successive passes, by a cutter occupying a localized station in the path travelled by the edge of the conveyed plate.

Following said machining of the edge, the fly is bent inwardly to bring the curtain face 12 hard against the flank face 13. Such bending is or may be performed by clamping the plate to a second carriage and progressively forcing the fly upwardly and inwardly by pressure exerted from a succession of free-turning rolls occupying localized stations along the plate's travel path.

If desired, the edging overlay 11 which is thereby produced may be bonded in its folded position by application to the two faces 12 and 13, before bending, of a material suitable for this purpose and such, for example, as Plastic Steel, a product of Devcon Corporation, Danvers, Mass. In lieu of bonding, the joint formed by the foldover is or may be sealed by a weld, grinding the sealing head flush with the exposed back face or side edge, as the case may be, of the plate.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What is claimed is:
1. The method of cladding the edge of a moderately thick metal plate having a side thereof completely clad with a cladding which is thin by comparison with the thickness of the plate, comprising milling the edge to form along the entire length thereof a re-entrant recess producing curtain and flank faces the former of which faces is parallel with the exposed face of the cladding upon the milled portion of the plate and is spaced therefrom a distance which no more than moderately exceeds the thickness of the cladding, thus to produce a thin fly which includes the cladding, and the latter of which faces lies angular to the curtain face, and bending said fly inwardly as an overlying fold upon said flank face of the recess.

2. A method as claimed in claim 1 in which the recess is right-angled so that the folding of the fly inwardly upon the flank face of the recess places the plate's edge cladding perpendicular to the adjacent side cladding of the plate.

3. A method as claimed in claim 2 in which the milling is so performed as not to reach the cladding, and leaves as a surface coating thereon a minuscule-thickness layer of the metal which composes the plate.

4. A method as claimed in claim 2 in which the material composing the plate is mild steel and that of the cladding stainless steel.

5. A method as claimed in claim 2 in which the curtain and flank faces of the recess are bonded together.

6. A method as claimed in claim 2 in which the ends of the joint formed by the fold-over are seal-welded.

7. A method as claimed in claim 2 in which at least a portion of the joint formed by the fold-over is seal-welded.

References Cited

UNITED STATES PATENTS

| | | |
|---|---|---|
| 1,305,652 | 6/1919 | Karl. |
| 1,422,655 | 7/1922 | Brehmer _____ 29—149.5 X |
| 1,651,792 | 12/1927 | Wernig _____ 29—497.5 X |
| 2,124,132 | 7/1938 | Bate _____ 29—149.5 |
| 2,149,882 | 3/1939 | Clements _____ 29—476 |
| 2,704,883 | 3,1955 | Hamilton _____ 29—471.5 |
| 2,744,314 | 5/1956 | Kinney _____ 29—471.5 |
| 3,375,563 | 4/1968 | Kingsbury _____ 29—149.5 |
| 3,375,572 | 4/1968 | Waterton _____ 29—482 |

JOHN F. CAMPBELL, Primary Examiner

B. L. ADAMS, Assistant Examiner

U.S. Cl. X.R.

29—476, 482; 113—116